United States Patent
Artusi

(10) Patent No.: US 8,152,357 B2
(45) Date of Patent: Apr. 10, 2012

(54) MIXING TANK FOR LIQUID SUBSTANCES OR THE LIKE

(75) Inventor: Gianni Artusi, San Donà di Piave (IT)

(73) Assignee: Pfaudler-Werke GmbH, Schwetzingen (DE)

( * ) Notice: Subject to any disclaimer, the term of this patent is extended or adjusted under 35 U.S.C. 154(b) by 660 days.

(21) Appl. No.: 11/992,680

(22) PCT Filed: Oct. 2, 2006

(86) PCT No.: PCT/EP2006/009551
§ 371 (c)(1),
(2), (4) Date: Apr. 20, 2009

(87) PCT Pub. No.: WO2007/039270
PCT Pub. Date: Apr. 12, 2007

(65) Prior Publication Data
US 2009/0207689 A1  Aug. 20, 2009

(30) Foreign Application Priority Data
Oct. 4, 2005  (IT) .............................. MI2005A1861

(51) Int. Cl.
*B01F 15/00* (2006.01)
*B23P 17/04* (2006.01)
(52) U.S. Cl. ......... 366/140; 366/142; 366/151; 366/307
(58) Field of Classification Search .................. 366/140, 366/142, 151, 152.3–152.4, 307, 147, 96–98
See application file for complete search history.

(56) References Cited

U.S. PATENT DOCUMENTS

| 4,176,968 A * | 12/1979 | Kromer et al. .................. 366/97 |
| 4,605,172 A * | 8/1986 | Ahlert .............................. 241/33 |
| 5,516,423 A * | 5/1996 | Conoby et al. .................. 210/85 |
| 6,152,019 A * | 11/2000 | Heyde .............................. 99/348 |
| 6,402,361 B1 * | 6/2002 | Reinemuth ................... 366/136 |
| 7,607,821 B2 * | 10/2009 | Schmidt ........................ 366/307 |
| 2003/0151973 A1 * | 8/2003 | Gartland et al. .............. 366/249 |
| 2005/0270899 A1 * | 12/2005 | Phallen et al. ............. 366/160.2 |

FOREIGN PATENT DOCUMENTS

| DE | 20105748 U1 | 4/2001 |
| EP | 0614595 B1 | 9/1994 |
| EP | 1156312 B1 | 11/2001 |
| EP | 1310457 A3 | 11/2002 |
| FR | 2277004 | 7/1975 |
| FR | 2544627 A1 | 10/1984 |
| FR | 2850039 | 7/2004 |

* cited by examiner

Primary Examiner — Joseph Del Sole
Assistant Examiner — Nahida Sultana
(74) Attorney, Agent, or Firm — Michael L. Dunn

(57) ABSTRACT

A vessel (1) for the mixing of fluid substances (4) is provided, which is fully lined on the inside with synthetic enamel or the like and which includes a main body (2), a lid (3) for the main body, a stirrer (5) inside the main body (2), and a multiplicity of additional devices (12, 15) for controlling and monitoring the substance mixture, characterized in that it has a multiplicity of support elements (13) for the multiplicity of additional devices (12, 15), which are integrally mounted on the inner surfaces of the main body and are likewise fully coated, each support element (13) being suitable for removable mounting of the respective additional device of the multiplicity of additional devices (12, 15) inside the main body (2).

9 Claims, 4 Drawing Sheets

Fig. 2A  Fig. 2B

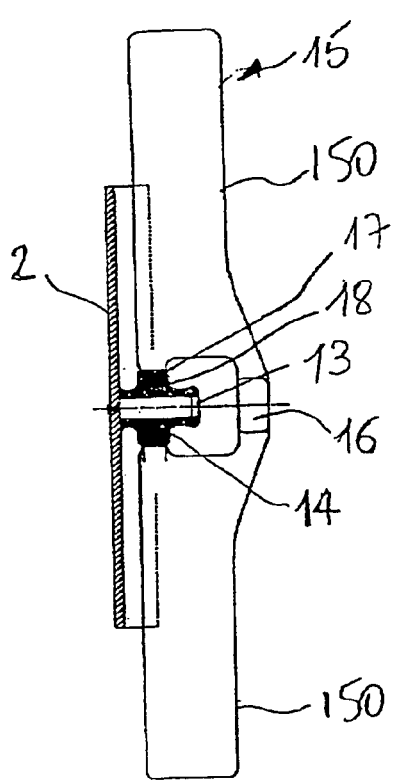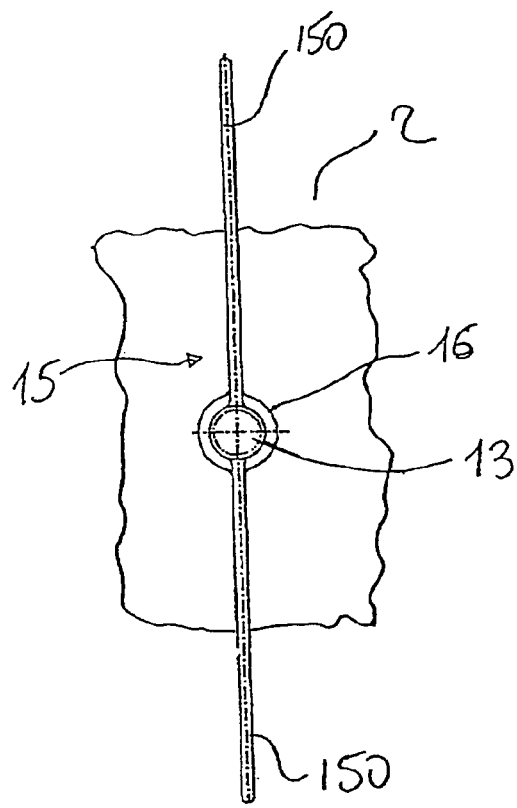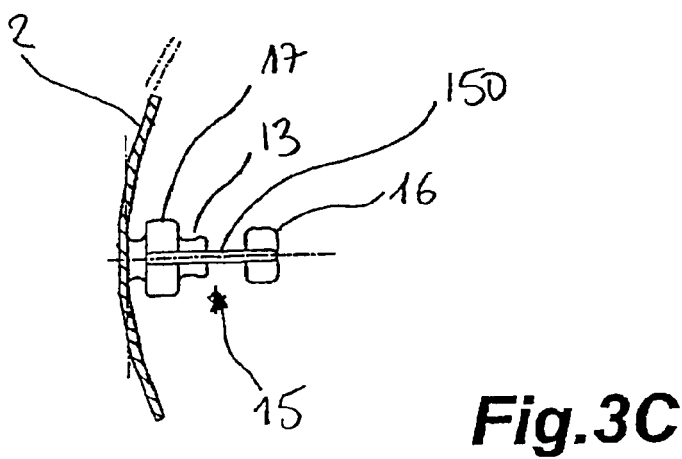
Fig. 3A
Fig. 3B
Fig. 3C

MIXING TANK FOR LIQUID SUBSTANCES OR THE LIKE

BACKGROUND OF THE INVENTION

The present invention relates to a vessel or reactor for the treatment of fluid substances, especially a vessel or reactor for fluid substances of the type which is equipped with a stirring system and has a lined inner surface.

So-called reactor vessels for the mixing and/or reaction of fluid substances, which may or may not have a solid and/or gaseous phase, have been widely known hitherto. Such vessels or reactors are widely used in the chemical industry for the preparation of chemical substances which are produced after stirring or reaction of other substances. Such reactor vessels have a preferably pressure-tight tank made of metal, in which a number of fittings and devices are installed for processing the substances contained therein as well as for monitoring and controlling the preparation process. Such devices typically include a stirrer, which is mounted inside the vessel in various positions, for example with a vertical or inclined axis, coaxially with the vessel or eccentrically, one or more baffles, which are fixed to the vessel walls to increase the intermixing of the substances during the stirring operation, immersion pipes for feeding in process materials or for removing products, temperature-measuring devices for the mixture, pressure-measuring devices for the tank internal pressure, and so on.

For applications using chemically very aggressive substances, such as acids and like substances, the tank and all the above-mentioned additional devices are lined or coated with an acid-resistant material. Lining with glass enamel, ceramic enamel or the like is typically preferred in view of its practical applicability and reliability. For that reason, for such applications all the surfaces of the apparatus and of the associated devices that come into contact with the mixture are coated with the above lining.

That structural solution has a first disadvantage, however, that the tank and the associated additional devices integral with the tank, once lined with the above-mentioned surface treatment, can no longer be modified or removed in order that the continuous surface of the above-mentioned lining be not broken. That disadvantage is particularly serious when it is necessary for process-related reasons to make modifications to the reactor and the fittings integral therewith or to add further fittings. For example, it could be necessary to change the number, the arrangement or the shape of the baffles. It could also be necessary for an internal component that is vibrating or is being excessively stressed by the action of the stirrer to be secured to the vessel wall.

A second disadvantage presented by the monolithic structure of the vessel with its fittings is the necessity to re-enamel the entire apparatus even if the enamelled lining of only one of its fittings has been damaged.

The re-enamelling cannot be carried out on-site; because it is a very special process, which consists of a plurality of baking operations in special ovens at temperatures of about 900° C., it is necessary to return the apparatus to the manufacturer, which involves a great deal of expense for demounting from the plant and for shipping as well as loss of production.

BRIEF SUMMARY OF THE INVENTION

The aim of the present invention is to offer a solution for the above disadvantages by providing a mixing vessel of the type which is provided with surface-lining of its inner surfaces and which has a number of support elements which are integral with the inner surfaces and are suitable for removably supporting a number of fittings that contribute to controlling the reaction or the mixing of the substances contained therein.

In accordance with the invention a vessel is provided for the mixing of fluid substances with or without a solid and/or gaseous phase. The vessel usually has an inner surface fully lined with a glass enamel, ceramic enamel or other lining material.

In most embodiments, the vessel has:
a main body lined on the inside,
  a main body lid directly welded to or flange-mounted on the main body, the main body lid being lined on the inside,
  a stirring system having a stirrer mounted inside of the main body, and
  a multiplicity of additional devices operative to control and monitor a preparation process carried out in the vessel, the additional devices being fully coated and mounted inside the main body, wherein the vessel has a multiplicity of support or anchoring elements for the multiplicity of additional devices, the support or anchoring elements being integrally mounted on the inner surfaces of the main body and being fully coated, and wherein the multiplicity of support elements is operative to removably mount or anchor the multiplicity of additional devices inside the main body.

Desirably each support element of the multiplicity of support elements includes:
  a cylindrical body joined integrally at one end to the inner surface of the vessel body; and
  an external surface region formed on the cylindrical body operative to removably mount a corresponding additional device joined to the cylindrical body.

Also desirably each support element of the multiplicity of support elements has:
  a cylindrical hollow body integral at one end with the inner surface of the vessel body and communicating with the outside of the inner surface of the vessel body;
  a closure element operative to close the hollow body and arranged integrally at the free end thereof; and
  an external surface region of the cylindrical body operative to removably mount a corresponding additional device joined to the cylindrical body.

The surface region operative to mount the support element of the multiplicity of support elements is desirably fully coated with the lining material and is removably couplable to a corresponding complementary additional device by an interference-fit.

The support element is also desirably able to accommodate a complementary additional device in its interior. The additional device is usually selected from the group consisting of a measuring device, a temperature probe, a level-measuring device, a pH/redox-measuring device, and a sampling device, and the closure element has an opening for connection to the interior of the vessel.

A baffle may be provided for a mixing vessel as above described where the baffle is preferably fully coated with a ceramic enamel, glass enamel or other lining material and is adapted to be removably mounted in the mixing vessel on a corresponding support element.

The baffle usually includes
  a central body consisting of a boss having a pair of bodies, of which one body is annular and one is disc-shaped, one of the bodies having a coupling surface which is complementary to the coupling surface of a corresponding support element of the vessel; and a blade-like surface joined to the pair of bodies.

The coupling surface is usually also fully coated with the lining material.

The invention also includes a method of mounting a vessel for the mixing of fluid substances with or without a solid and/or gaseous phase.

The method includes the steps of:

making a multiplicity of cylindrical support elements for additional devices of the vessel integral with the inner walls of the vessel body before lining the inner surface of the vessel;

fully lining the inner surfaces of the vessel with a ceramic enamel, glass enamel or other lining material, fully coating the multiplicity of support elements with the lining material;

grinding a surface region of the multiplicity of support elements; and removably mounting an additional device fully coated with the lining material by interference-fit on the surface region of a corresponding support element.

BRIEF DESCRIPTION OF THE SEVERAL VIEWS OF THE DRAWINGS

FIGS. 2A to 2C show in detail an integral support element for an additional device of the mixing vessel according to the invention in a longitudinal section, in a front view and in a plan view, respectively;

FIGS. 3A to 3C show an additional device which is mounted on the integral support element according to FIGS. 2A to 2C, in a longitudinal section, in a front view and in a plan view, respectively; FIG. 4A illustrates the concept of modular components, with a plurality of basic components being combinable to form more complex systems.

DETAILED DESCRIPTION OF THE INVENTION

In accordance with a first advantageous feature of the lined mixing vessel according to the invention, the inner surfaces of the vessel are fully lined with a protective layer of material that is resistant to extremely aggressive substances and at the same time, by virtue of the special configuration of a multiplicity of support elements arranged integrally with the inner surfaces of the vessel, it is made possible to carry out mounting and demounting for the purpose of adding, removing or replacing any fitting or device in accordance with the requirements of the process, without the continuous surface of the protective layer of the walls either of the vessel or of the fitting or device being broken. In other words, the support elements provide the reactor with adaptability to new preparation processes (which is very useful in the case of multipurpose plants), which is lacking in conventional enamelled reactors.

In accordance with a second advantageous feature of the lined mixing vessel according to the invention, it is possible to remove or replace damaged components in the tank as well as to remove or mount the components and additional devices arranged on its walls, without the need for subsequent procedures for restoring the lining on the tank itself. That means that, if necessary, it is possible merely to replace the componenent or fitting in question without having to plan for subsequent restoration of the lining of the tank inner walls, which considerably reduces the amount of time and expense involved with such a procedure.

In accordance with a third advantageous feature of the lined mixing vessel according to the invention, the tank has a multiplicity of supports which are arranged integrally on its inner walls, which supports are suitable for supporting a variety of additional devices and which can be constructed as separate, standard components, also on the basis of the concept of modular components, without it being necessary to carry out any restoration of the protective layer after the device has been mounted on the corresponding support or has been removed therefrom.

A detailed description of a preferred embodiment of the lined mixing vessel according to the invention is given below, by way of example and without constituting a limitation, with reference to the accompanying drawings.

Figure 1:
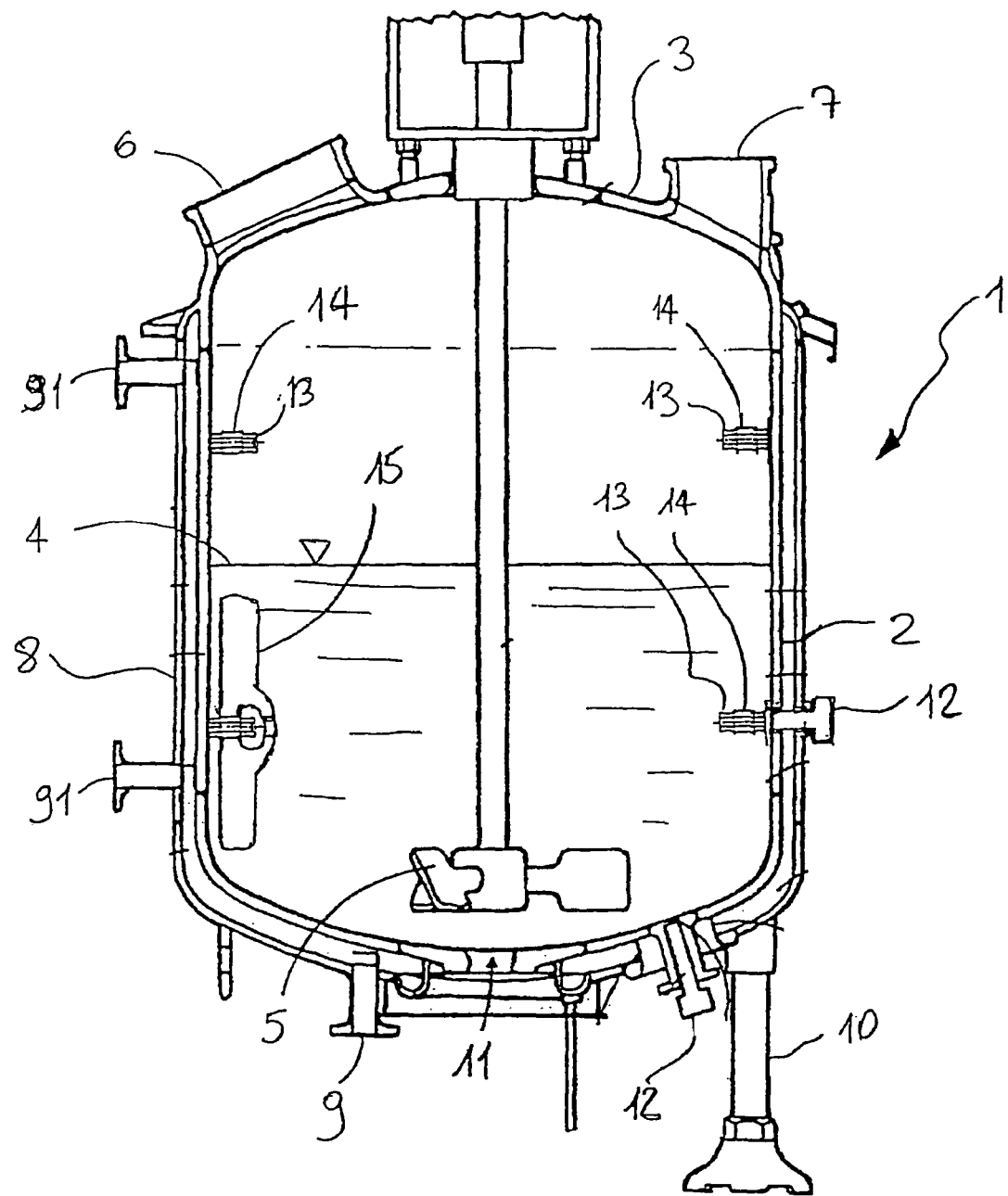
FIG. 1 shows diagrammatically a mixing vessel according to the present invention in which the supports for the additional devices are incorporated at its inner walls.

Referring to FIG. 1, the mixing vessel according to the present invention is shown therein diagrammatically.

According to the invention, a vessel 1 is provided which can be supported in a vertical position on supports 10 which, as required, can be replaced by other support elements, such as brackets or eyes, and which vessel consists of a main body 2 to which there is joined a lid 3 which is welded thereto or, alternatively, flange-mounted thereon. The vessel 1 contains a fluid substance 4 to be mixed by means of a stirrer 5 which is driven by a control unit (not shown) which generally consists of a motor, reduction gear, dynamic seal unit and motor stool and is mounted on the lid 3 in a manner already known per se.

It should be pointed out here that all the surfaces of the vessel and of the associated additional devices are coated with a lining material which is typically selected from a group consisting of glass enamel, ceramic enamel and the like, in order that the whole can withstand the corrosive action of the aggressive substances contained therein.

Furthermore, on the walls of the lid 3 there can typically be provided a multiplicity of openings, such as, for example, a manhole 6 for inspection, and supports 7 for mounting further additional devices (not shown in the Figure and already known in the prior art) or for connection to the plant pipelines.

Moreover, the vessel 1 can be equipped with a jacket 8 (or other equivalent devices, such as, for example, a half-pipe coil jacket) which serves for heating, cooling or controlling the temperature of the process fluid by means of a flow of fluid which is fed in through the connections 9 and 91, is circulated in the intermediate space 2 and then flows out from the connections 9 and 91 (inflow and outflow depend upon the type of fluid and upon the heat exchange for which the fluid itself is defined).

Also provided is an opening 11 which is arranged on the lowermost part of the main body 2, with the result that the vessel 1 can be emptied when necessary. In addition, an externally accessible housing can be provided for a temperature probe 12, which serves for detecting the temperature of the wall in contact with the substance being mixed.

According to the present invention, the main body 2 has on its inner surface a multiplicity of support elements 13 (four of which are shown in the Figure), each support element supporting a multiplicity of additional devices mounted inside the vessel 2, such as, for example, baffles, thermometric probes, level-measuring devices, sampling devices and the like.

Each support element 13 consists of a cylindrical main body which is joined integrally to the inner surface of the body 2. As will be explained in more detail below, according to its use the support element 13 can be formed from a single solid or hollow or tubular element.

More specifically, the support element 13 has on the outside a surface region 14 which, after the coating with the lining material and the subsequent grinding, is able to form a removable anchoring surface dimensioned for interference-fit for a corresponding additional device mounted thereon, such as, for example, a baffle 15, which is necessary to increase the turbulence and intermixing of the components during the stirring operation. In fact, by virtue of the mechanical properties of the lining used (typically ceramic enamel or glass enamel or the like), the latter has the ability to absorb very high compressive loads (even 10 times as much as steel) without its being detached from its own support, which makes it especially suitable and advantageous for interference-fit clamping together of parts that are not movable relative to one another.

On the other hand, if the support element 13 is formed with a cylindrical hollow or tubular element, it is mounted so that the inner surface of the cylindrical support element 13 communicates with the outer surface of the vessel 2, so that the support element 13 proves to be suitable for supporting a fitting such as a temperature probe 12 or the like.

Figure 2C:
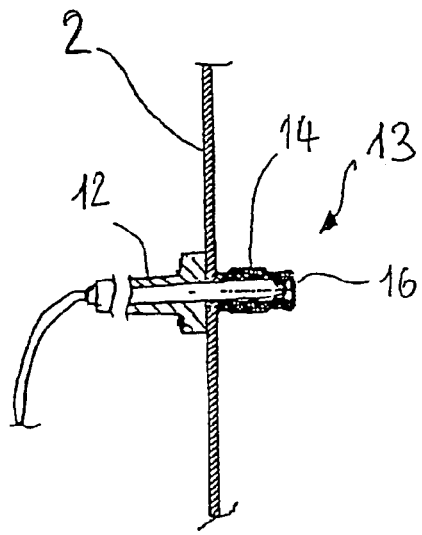
Figure 2C:
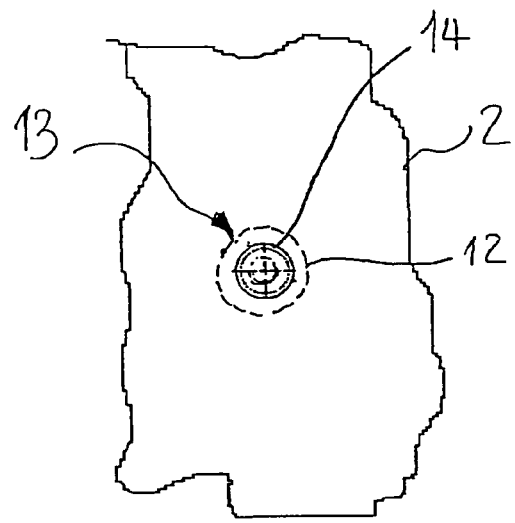
Figure 2C:
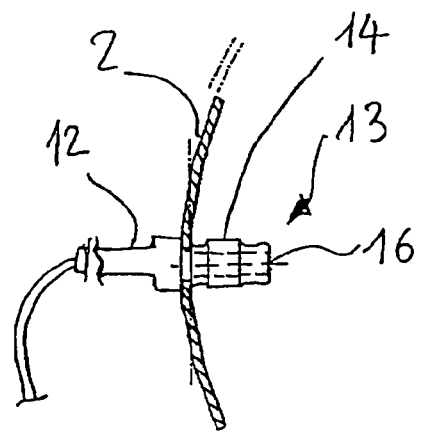

Referring to FIGS. 2A to 2C, a hollow support element 13 in accordance with the present invention is shown therein in a longitudinal section, in a front view and in a plan view, respectively.

As can be seen from the Figures, the arrangement of the support element 13 is such that when the support element 13 is hollow it communicates at one end with the outer portion of the wall of the vessel 2, the other end being provided with a closure element 16 which is to ensure impermeability with respect to the outside. In that state, the support element 13 can accommodate a device such as temperature probe 12 or the like in its interior.

Alternatively, when probes such as, for example, a level probe, a sampling probe, a pH probe or a redox probe are used, the closure element 16 of the support 13 can have a bore in order that the sensor of the probe can be brought into direct connection with the interior of the vessel (2). In that case, the probe in question is mounted and attached so that complete sealing of the fluid and pressure inside the vessel (2) is ensured in a manner already known.

Referring to FIGS. 3A to 3C, an integral support element 13 in accordance with the present invention is shown therein in a longitudinal section, in a front view and in a plan view, respectively.

As can be seen from the Figures, to provide support for a baffle 15 the anchoring surface 14 of the support element 13 is coupled by an interference-fit to a complementary surface of the baffle 15. More specifically, the baffle 15 has a central boss which consists of an annular element 17 and a disc-shaped element 161 integral with which there is provided a pair of blade-like surfaces 150. The annular element 17 facing the vessel wall 2 has a coupling surface 18 which is complementary to the anchoring surface 14 of the support element.

In fact, it is possible, by virtue of the compressive strength of the lining material, to couple the component 15 to the support element 13 by an interference-fit, the clamping on the coated surfaces 14 and 18 being achieved without the need to use further auxiliary elements, such as seals or anchor bolts. For the purpose of the above-mentioned coupling, before mounting on the support element 13 is carried out it is preferable for both the surface 14 of the support and the surface 18 of the baffle 15 to be subjected to a grinding step. Furthermore, by virtue of that type of coupling it is possible for the baffle 15 to be removed from its seat 14 by means of a suitable implement or a lifting device without causing damage to the lining of the baffle and, more especially, without interfering with the lining of the vessel walls 2, which therefore renders the lining suitable for an extremely wide range of uses.

Figure 4A:
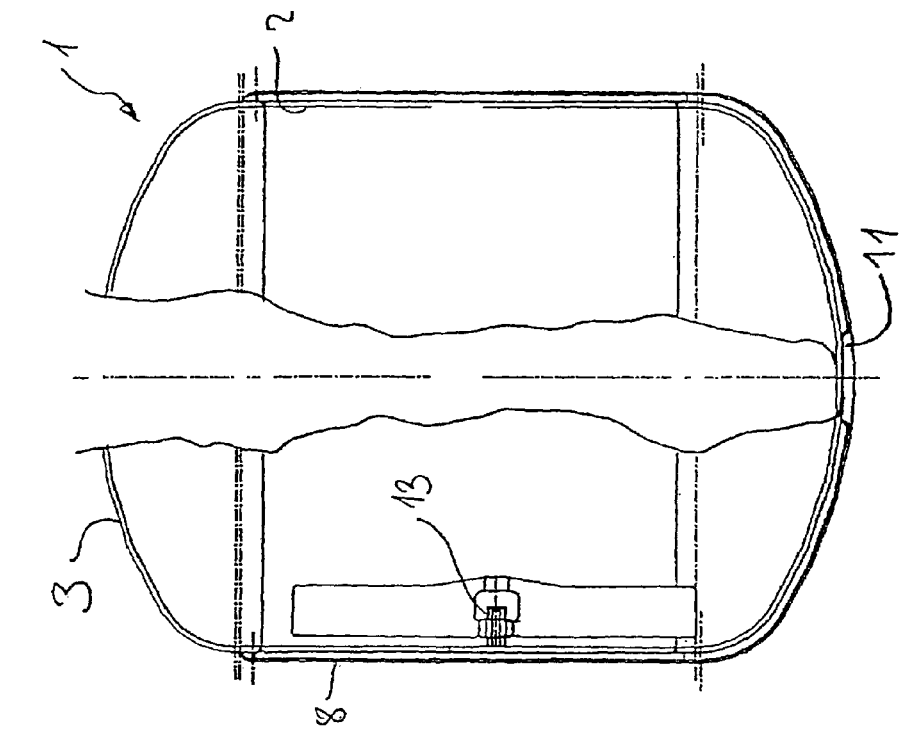
FIGS. 4A and 4B show two variants of a mixing vessel tank according to the invention. Furthermore.
Figure 4B:
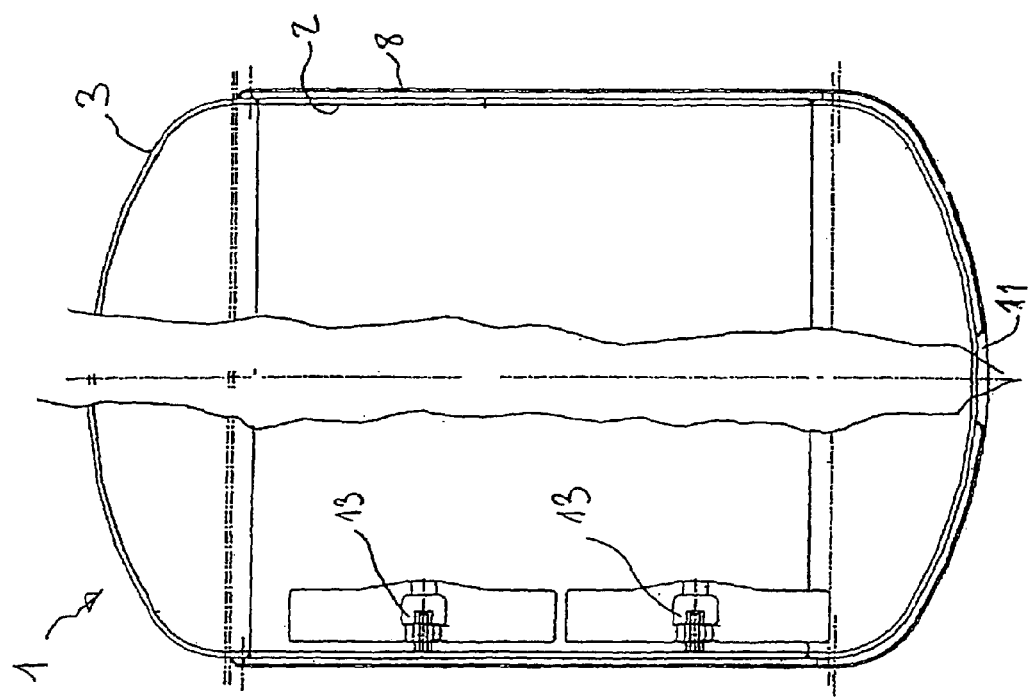

Referring to FIGS. 4A and 4B, two alternative configurations of the vessel 1 according to the invention are shown diagrammatically therein. As can be seen from the Figures, by virtue of the presence of support elements 13 in the main body 2 it is possible to implement a variety of configurations of additional devices 15 according to the use and according to the type of substance being mixed.

It will be apparent to the person skilled in the art that numerous variants of the present invention can be provided without thereby departing from the scope of protection of the accompanying patent claims. For example, the vessel 2 can have various arrangements and numbers of fittings mounted on the support elements 13; moreover, various configurations of such fittings mounted on the support elements 13 are also possible, because they are mounted so as to be removable without the continuous surface of the lining material being broken.

What is claimed is:

1. A vessel for the mixing fluid substances, wherein the fluid substances may include a solid and/or gaseous phase, said vessel having an inner surface fully lined with a glass enamel, ceramic enamel or other lining material, said vessel comprising:

a main body lined on the inside, a main body lid directly welded to or flange-mounted on said main body, said main body lid being lined on the inside, a stirring system having a stirrer mounted inside said main body, and a multiplicity of additional devices operative to control and monitor a preparation process carried out in said vessel, said additional devices being fully coated and mounted inside said main body, wherein said vessel has a multiplicity of support or anchoring elements for said multiplicity of additional devices, said support or anchoring elements being integrally mounted on the inner surfaces of said main body and being fully coated, and wherein said multiplicity of support elements is operative to removably mount or anchor said multiplicity of additional devices inside said main body.

2. The vessel according to claim 1, wherein each support element of the multiplicity of support elements comprises:

a cylindrical body joined integrally at one end to the inner surface of said vessel body; and an external surface region formed on said cylindrical body operative to removably mount a corresponding additional device joined to said cylindrical body.

3. The vessel according to claim 1, wherein each support element of said multiplicity of support elements comprises:

a cylindrical hollow body integral at one end with said inner surface of said vessel body and communicating with the outside of said inner surface of said vessel body;

a closure element operative to close said hollow body and arranged integrally at the free end thereof; and an external surface region of said cylindrical body operative to removably mount a corresponding additional device joined to said cylindrical body.

4. The vessel according to claim 1, wherein said surface region operative to mount said support element of said multiplicity of support elements is fully coated with the lining material and is removably couplable to a corresponding complementary additional device by an interference-fit.

5. The vessel according to claim 3, wherein said support element is operative to accommodate a complementary additional device in its interior.

6. The vessel according to claim 5, wherein said additional device is selected from the group consisting of a measuring device, a temperature probe, a level-measuring device, a pH/redox-measuring device, and a sampling device, and said closure element has an opening for connection to the interior of said vessel.

7. The vessel according to claim 1, comprising: a baffle being fully coated with a ceramic enamel, glass enamel or other lining material, said baffle being adapted to be removably mounted in said mixing vessel on a corresponding support element.

8. The vessel according to claim 7, wherein said baffle comprises: a central body consisting of a boss having a pair of bodies, of which one body is annular and one is disc-shaped, one of said bodies having a coupling surface which is complementary to the coupling surface of a corresponding support element of said vessel; and a blade-like surface joined to said pair of bodies.

9. The vessel according to claim 8, wherein said coupling surface is fully coated with said lining material.

* * * * *